(12) United States Patent
Watanabe

(10) Patent No.: US 10,195,918 B2
(45) Date of Patent: Feb. 5, 2019

(54) HYDRAULIC DAMPER

(71) Applicant: Tein, Inc., Kanagawa (JP)

(72) Inventor: Hironao Watanabe, Yokohama (JP)

(73) Assignee: Tein, Inc., Kanagawa (JP)

( * ) Notice: Subject to any disclaimer, the term of this patent is extended or adjusted under 35 U.S.C. 154(b) by 11 days.

(21) Appl. No.: 14/911,163

(22) PCT Filed: Aug. 26, 2014

(86) PCT No.: PCT/JP2014/072262
§ 371 (c)(1),
(2) Date: Feb. 9, 2016

(87) PCT Pub. No.: WO2015/029984
PCT Pub. Date: Mar. 5, 2015

(65) Prior Publication Data
US 2016/0185181 A1    Jun. 30, 2016

(30) Foreign Application Priority Data

Aug. 26, 2013 (JP) ................. 2013-174397

(51) Int. Cl.
*F16F 13/00* (2006.01)
*B60G 17/08* (2006.01)
(Continued)

(52) U.S. Cl.
CPC ........... *B60G 17/08* (2013.01); *B60G 15/061* (2013.01); *F16F 9/49* (2013.01); *F16F 9/5126* (2013.01);
(Continued)

(58) Field of Classification Search
CPC .. F16F 9/062; F16F 9/49; F16F 9/5126; F16F 9/585; F16F 13/007; B60G 17/08; B60G 15/061; B60G 2202/30; B60G 2206/40
See application file for complete search history.

(56) References Cited

U.S. PATENT DOCUMENTS 2,619,199 A    11/1952    Schwary
2,742,112 A    4/1956    Wessel
(Continued)

FOREIGN PATENT DOCUMENTS

JP    2005-299786 A    10/2005
JP    2012-503751 A    2/2012
WO    WO-2010-036508 A1    4/2010

OTHER PUBLICATIONS

"International Application Serial No. PCT/JP2014/072262, International Search Report dated Sep. 22, 2014", (w/ English Translation), 5 pgs.
(Continued)

*Primary Examiner* — Melody M Burch
(74) *Attorney, Agent, or Firm* — Schwegman Lundberg & Woessner, P.A.

(57) ABSTRACT

A position-and-velocity dependent hydraulic damper is provided. The hydraulic damper has piston valve fixed to a tip of a piston rod, a base valve, and a reservoir chamber. The base valve has a compression side port. Between a first valve and the base valve, a first spiral spring is provided, and between the first valve and the piston valve, a second spiral spring is provided. The compression side port is closed by the first valve around the maximum compression state, reducing the flow rate of oil to the reservoir chamber. A second valve passing through the centers of the first valve and the base valve adjusts the flow rate of the oil to the reservoir chamber with a pressure equal to or higher than a prescribed level of an oil chamber.

2 Claims, 30 Drawing Sheets

(51) Int. Cl.
*F16F 9/49* (2006.01)
*F16F 9/512* (2006.01)
*F16F 9/58* (2006.01)
*B60G 15/06* (2006.01)
*F16F 9/06* (2006.01)

(52) U.S. Cl.
CPC ............ *F16F 9/585* (2013.01); *F16F 13/007* (2013.01); *B60G 2202/30* (2013.01); *B60G 2206/40* (2013.01); *F16F 9/062* (2013.01)

(56) References Cited

U.S. PATENT DOCUMENTS

| | | | | |
|---|---|---|---|---|
| 4,768,629 A | * | 9/1988 | Wossner | F16F 9/49 188/271 |
| 4,782,925 A | * | 11/1988 | Grundei | F16F 9/49 188/284 |
| 5,333,708 A | * | 8/1994 | Jensen | F16F 9/516 188/284 |
| 5,462,143 A | * | 10/1995 | Sasse | B60G 17/08 188/266.3 |
| 9,033,121 B2 | | 5/2015 | Kazmirski et al. | |
| 2008/0125727 A1 | * | 5/2008 | Seibold | A61M 5/14526 604/264 |
| 2010/0078275 A1 | | 4/2010 | Kazmirski et al. | |
| 2011/0209956 A1 | * | 9/2011 | Maeda | F16F 9/3488 188/322.13 |
| 2014/0318908 A1 | | 10/2014 | Kazmirski et al. | |

OTHER PUBLICATIONS

"International Application Serial No. PCT/JP2014/072262, Written Opinion dated Sep. 22, 2014", 4 pgs.
"European Application Serial No. 14841233.1, Extended European Search Report dated Apr. 12, 2017", 8 pgs.
"Indian Application Serial No. 201637004147, Examination Report dated Oct. 29, 2018", (dated Oct. 29, 2018), 6 pgs.

* cited by examiner

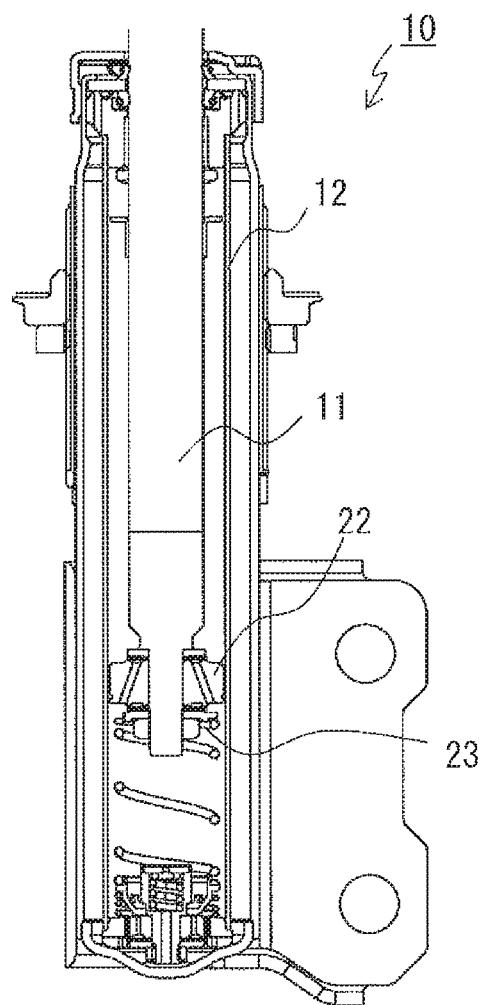
F I G. 3 A

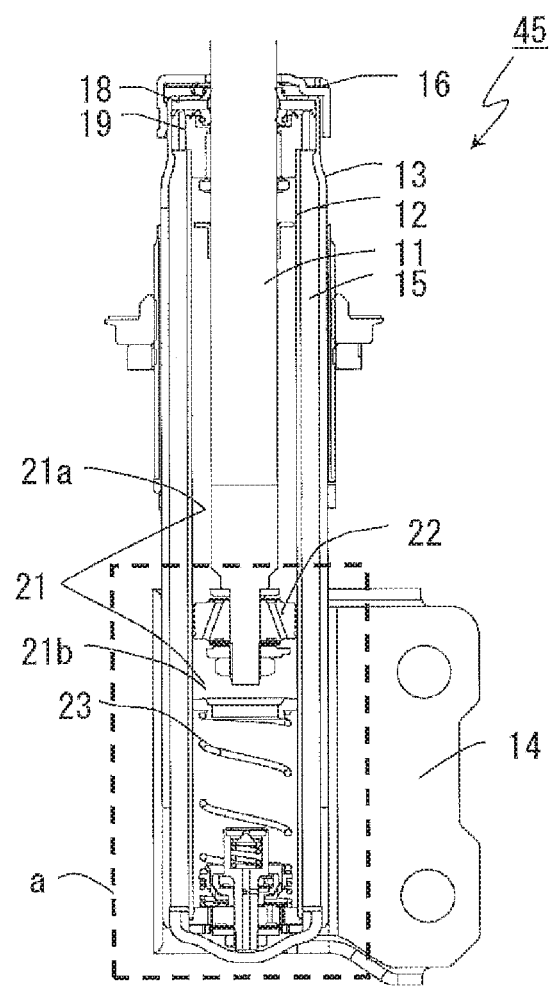
F I G. 6A

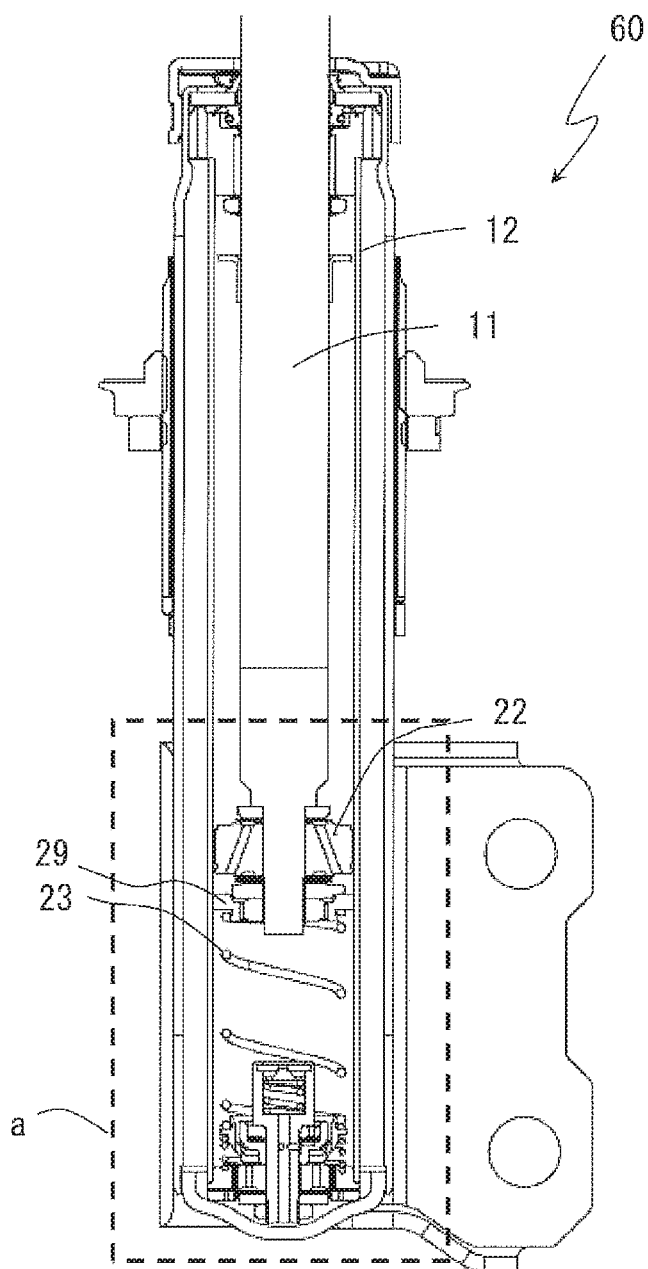
F I G. 10A

HYDRAULIC DAMPER

RELATED APPLICATIONS

This application is a U.S. National Stage Filing under 35 U.S.C. § 371 of International Application No. PCT/JP2014/072262, filed on Aug. 26, 2014, and published as WO 2015/029984 A1 on Mar. 5, 2015, which claims priority to Japanese Application No. 2013-174397, filed Aug. 26, 2013, which applications and publication are incorporated herein by reference in their entirety.

FIELD

The present invention is related to a hydraulic damper used for passenger vehicles, trucks, motorcycles, etc.

BACKGROUND

In a hydraulic damper used for a vehicle such as passenger vehicles, trucks, motorcycles, etc. bump stop rubber etc. is conventionally and generally used in order to prevent the components from abutting on each other in a compressed state of the dumper.

For example, a cushion device is disclosed in which at least one of the mutually abutting surfaces of the bump stop rubber or the bump stopper is provided with concaves and convexes in order to attenuate impacts on the damper by making the bump stop rubber and the bump stopper abut on each other when the damper is compressed to the maximum level (see FIG. 1 of Patent Document 1 for example)

FIG. 1 shows an example of a conventional configuration that uses a bump stop rubber as described above in a hydraulic damper. The hydraulic damper shown in FIG. 1 includes an upper mount 1 for fixing the hydraulic damper to the vehicle body, an upper spring sheet 2 disposed below the upper mount 1, a piston rod 3 fixed in such a manner that it can swing with respect to the upper mount 1 and the upper spring sheet 2, a cylinder 5 having an oil chamber 4, etc.

The hydraulic damper shown in FIG. 1 further includes a piston valve 6 that partitions the oil chamber 4 in the cylinder 5 into oil chambers 4a and 4b, an outer cylinder 7 that covers the outer periphery of the cylinder 5, and a bump stopper 8 which has the piston rod 3 inserted into its center hole and whose outer peripheral portion is fit into the upper end portion of the outer cylinder 7 so as to be fixed on it.

Further, bump stop rubber 9 that is fit with the piston rod 3 outside of the piston rod 3 is set between the bump stopper 8 and the upper spring sheet 2. The bump stop rubber 9 is configured by using an elastic member such as for example resin etc.

When a load is applied to a hydraulic damper to compress it, i.e., when the piston rod 3 has been pushed by the cylinder 5 as represented by arrow a, the bump stop rubber 9 functions as a cushion to prevent a situation where the upper spring sheet 2 and the bump stopper 8 directly abut on each other.

Patent Document 1 described above aims to attenuate impacts applied to a damper more effectively when the damper is compressed to the maximum level, by providing at least one of the mutually abutting surfaces of the bump stop rubber or the bump stopper with concaves and convexes in a cushion unit as described above.

PRIOR ART DOCUMENTS

Patent Documents

[Patent Document 1] Japanese Laid-open Patent Publication No. 2005-299786

SUMMARY OF THE INVENTION

Problem to be Solved by the Invention

Incidentally, bump stop rubber has a load characteristic that is determined in accordance with the displacement, sometimes leading to a case where an appropriate load characteristic is not obtained depending upon use conditions.

When for example the operation to the maximum compression position of a hydraulic damper is desired in a case when the displacement occurs sluggishly with a low load, the repelling force of the bump stop rubber prevents such an operation. When by contrast a rapid attenuation operation is desired in a case when the displacement occurs at a high speed with a high load, the load characteristic of the bump stop rubber, which is non-linear, prevents operations at an appropriate speed.

Also, when a bump stop rubber is used in a hydraulic damper, the upper spring sheet and the bump stopper abut via the bump stop rubber and the bump stop rubber, which is an elastic body, is compressed when the hydraulic damper is compressed to the maximum level.

A spring load caused by this compression of the bump stop rubber generates a repelling force. Accordingly, there has been a problem that the ride quality etc. is affected by a large repelling power when the damper is compressed close to the maximum level.

It is an object of the present invention to provide an inexpensive position-and-velocity dependent hydraulic damper that has an appropriate load characteristic in accordance with the load even when it is compressed close to the maximum level, that employs a configuration with minimum dimensions and that can easily change the damping force characteristic including the operation point, and thereby to solve the above conventional problem.

Means for Solving the Problem

In this document, a damping force is a force that suppresses vibrations proportionally to the vibration velocity. For example, the magnitude of a damping force is expressed by the resisting force generated depending upon the velocity of the piston reciprocating in a cylinder, i.e., the velocities of expansion and contraction of the damper.

In other words, a damping force means a force applied in the directions opposite from the vibration directions of an object. A large damping force leads to hard riding feeling, while a small damping force leads to floating riding feeling. Generally, sport cars and racing cars use hard springs for the dampers so as to obtain large damping forces. For general-purpose passenger vehicles, damping forces that have attained excellent balance between the driving stability and the ride quality are desired.

In order to solve the above problem, a hydraulic damper according to the primary image is configured to include a cylinder; oil that fills the cylinder in an encapsulated manner and that forms an oil chamber in the cylinder; a piston rod that reciprocates in the oil chamber; a piston valve that is secured to a tip of the piston rod, that partitions the oil chamber into an upper oil chamber and a lower oil chamber, and that reciprocates in sliding contact with inner periphery of the cylinder by being accompanied by the reciprocation of the piston rod; an outer cylinder that covers outer periphery of the cylinder; a reservoir chamber which is of a space between an inner peripheral surface of the outer cylinder and an outer peripheral surface of the cylinder and in which oil and gas are encapsulated; a bottom stopper that seals a bottom portion of the outer cylinder from outside; a base valve that is held by the bottom stopper and that has a first compression side port and a second compression side port that bring the lower oil chamber and the reservoir chamber into communications; a first valve that is held by the base valve via a first spiral spring; a second spiral spring that is held by the first valve, that is set between the first valve and the piston valve, that generates downward repel ling force when receiving a pressing force from the piston valve, and that closes the first compression side port by pressing the first valve downwardly resisting a biasing force of the first spiral spring; and a second valve that is disposed in a state that the second valve is passing through centers of the first valve and the base valve and that adjusts a flow rate of the oil with respect to the reservoir chamber when a pressure of the lower oil chamber of the cylinder becomes equal to or higher than a prescribed level because of an external load.

Further, in order to solve the above problem, the hydraulic damper according to the primary image is configured to include a cylinder; oil that fills the cylinder in an encapsulated manner and that forms an oil chamber in the cylinder; a piston rod that reciprocates in the oil chamber; a piston valve that is secured to a tip of the piston rod, that partitions the oil chamber into an upper oil chamber and a lower oil chamber, and that reciprocates in sliding contact with inner periphery of the cylinder by being accompanied by the reciprocation of the piston rod; an outer cylinder that covers outer periphery of the cylinder; a reservoir c bomber which is of a space between an inner peripheral surface of the outer cylinder and an outer peripheral surface of the cylinder and in which oil and gas are encapsulated; a bottom stopper that seals a bottom portion of the outer cylinder from outside; a base valve that is held by the bottom stopper and that has a first compression side port that brings the lower oil chamber and the reservoir chamber into communications; a first valve that is held by the base valve via a first spiral spring; a second spiral spring that is held by the first valve, that is set between the first valve and the piston valve, that generates downward repelling force when receiving a pressing force from the piston valve, and that closes the first compression side port by pressing the first valve downwardly resisting a biasing force of the first spiral spring; an annular main body unit; a second spiral spring guide that is engaged with an upper end of the second spiral spring at a lower end portion of the main body unit, that brings an outer peripheral surface of the main body unit into sliding contact with an inner peripheral surface of the cylinder and that is engaged with a lower end portion of the piston rod travelling into the cylinder; a second valve that is disposed in a state that the second valve is ping through centers of the first valve and the base valve and that adjusts a flow rate of the oil with respect to the reservoir chamber when a pressure of the lower oil chamber of the cylinder becomes equal to or higher than a prescribed level because of an external load; and a third valve that is provided to a bottom portion of the first valve, that is sandwiched by a hole of the first valve through which the second valve passes and outer periphery of the second valve, and that adjusts a flow rate of the oil with respect to the reservoir chamber in accordance with a prescribed presser of the lower oil chamber of the cylinder prior to the adjustment of the flow rate of the oil conducted by the second valve.

EFFECT OF THE INVENTION

According to the present invention, a damping force is adjusted in accordance with an external load and an appropriate damping force in accordance with a load can be obtained even before or after the maximum compression state while employing a configuration in which an appropriate load characteristic in accordance with a load is attained even when the damper is compressed close to the maximum level by using the damping force by an oil pressure and the dimensions of stacking internal constituent components that determines the maximum compression position of the hydraulic damper is minimized, and thereby it is possible to provide an inexpensive position-and-velocity dependent hydraulic damper that can easily change the damping force characteristic including the operation point.

As described above, according to the present invention, it is possible to obtain an appropriate damping force in accordance with a load at an arbitrary position a hydraulic damper in a compressed state. Also, by using a spring in the cylinder, it is possible to simplify the structure and to provide an inexpensive position-and-velocity dependent hydraulic damper that uses a smaller number of components and that suppresses increase in the dimensions.

BRIEF EXPLANATIONS OF THE DRAWINGS

FIG. 3A shows the state of a portion corresponding to that in FIG. 2A in the operation state in a case when the hydraulic damper according to example 1 is compressed and a load has started to be applied;

Figure 2A:
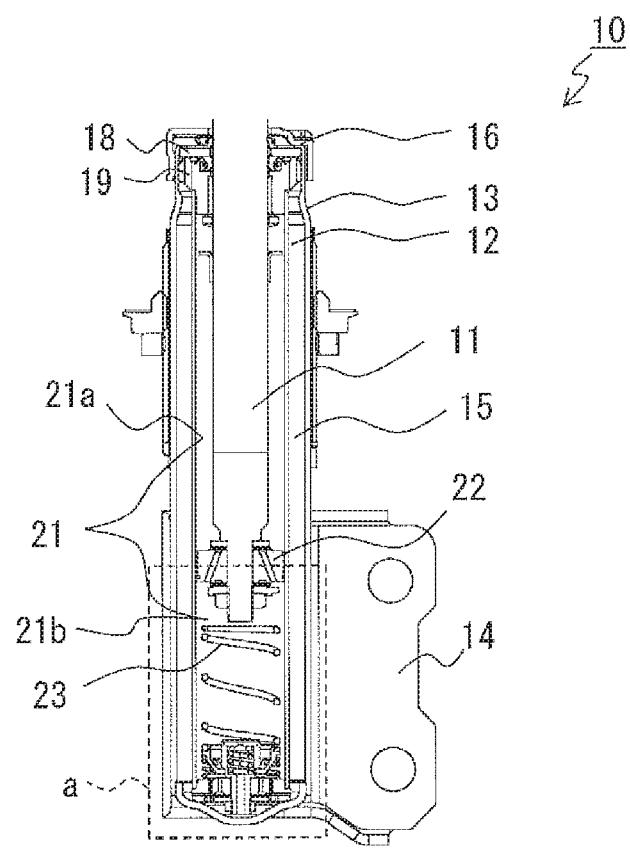
FIG. 2A is a sectional view of a hydraulic damper according to example 1 of the present invention showing a state where the hydraulic damper is not compressed and no load has been caused.
Figure 2B:
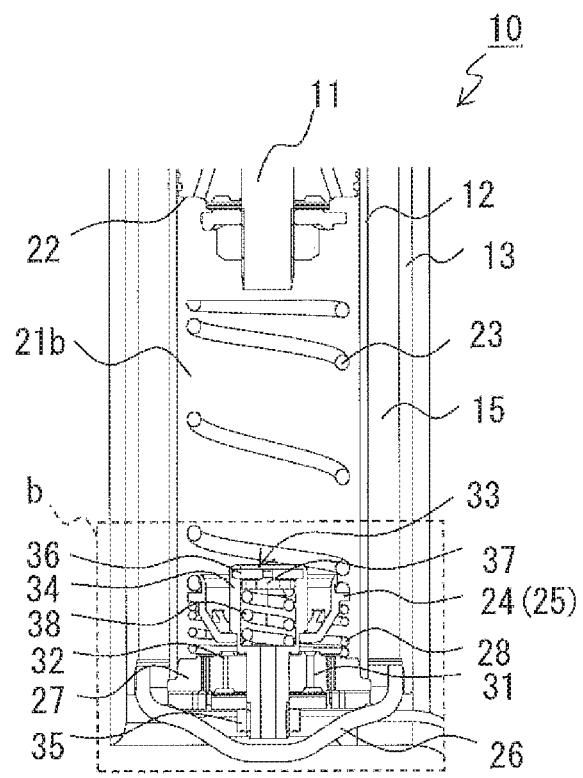
FIG. 2B is an enlarged view showing the portion enclosed by dashed line a in FIG. 2A.
Figure 2C:
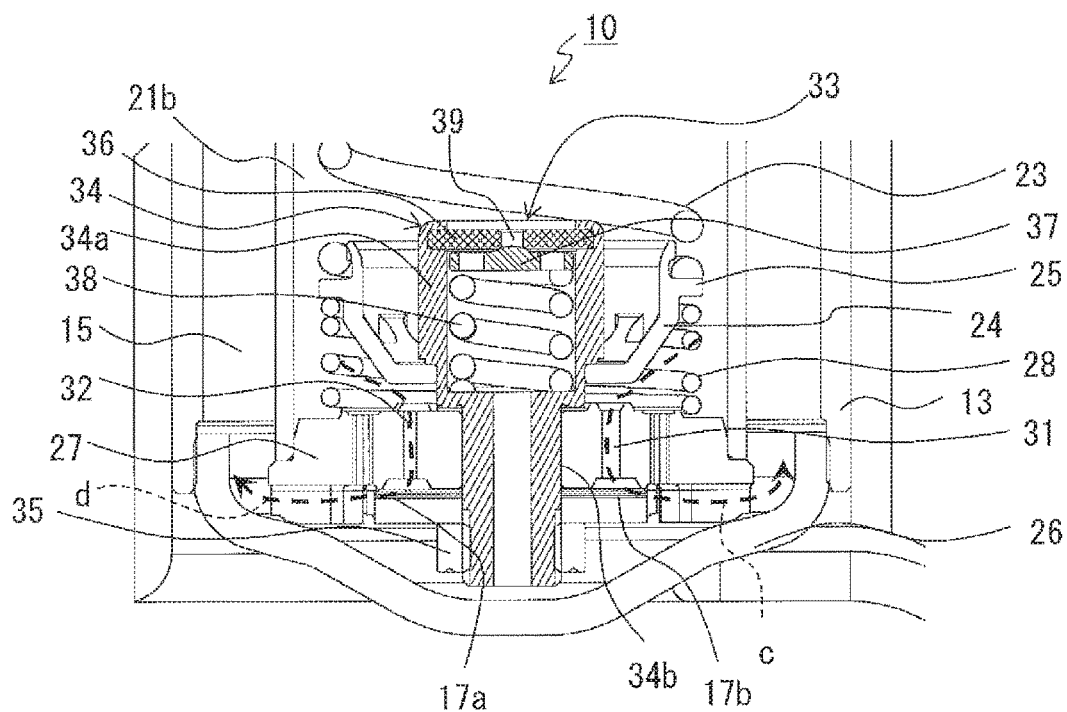
FIG. 2C is an enlarged view showing the portion enclosed by dashed line b in FIG. 2B.
Figure 2D:
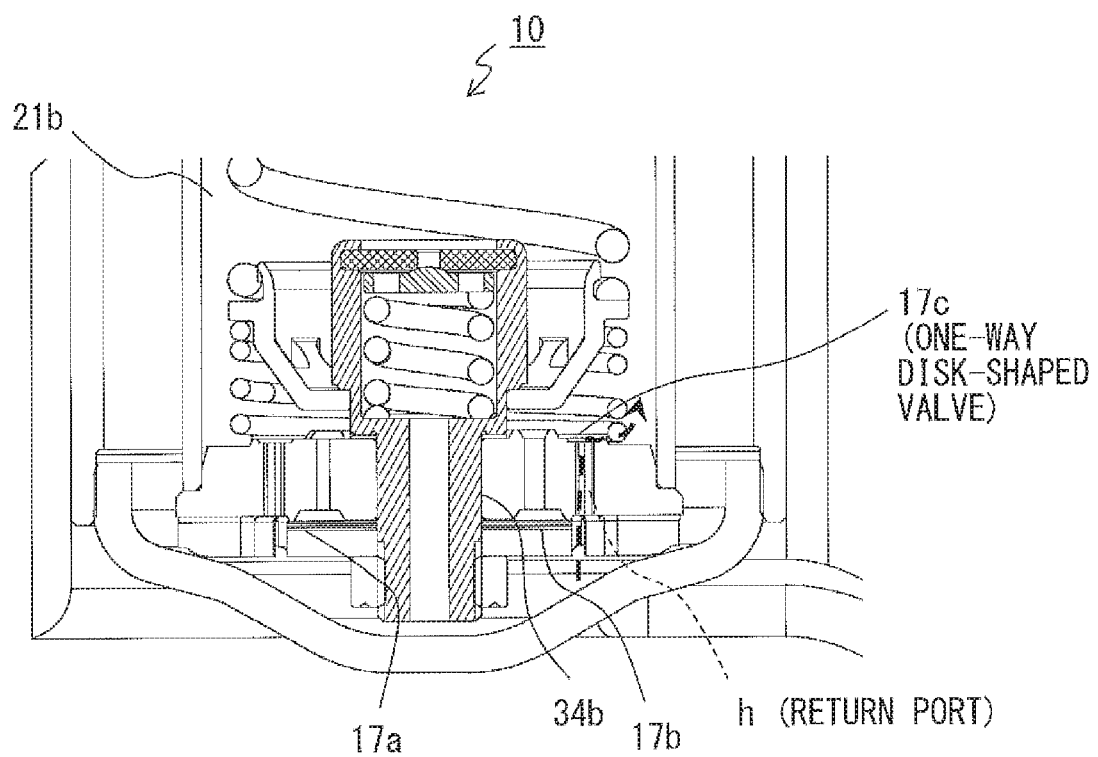
FIG. 2D shows a flow of oil in the expansion state of FIG. 2A.
Figure 5A:
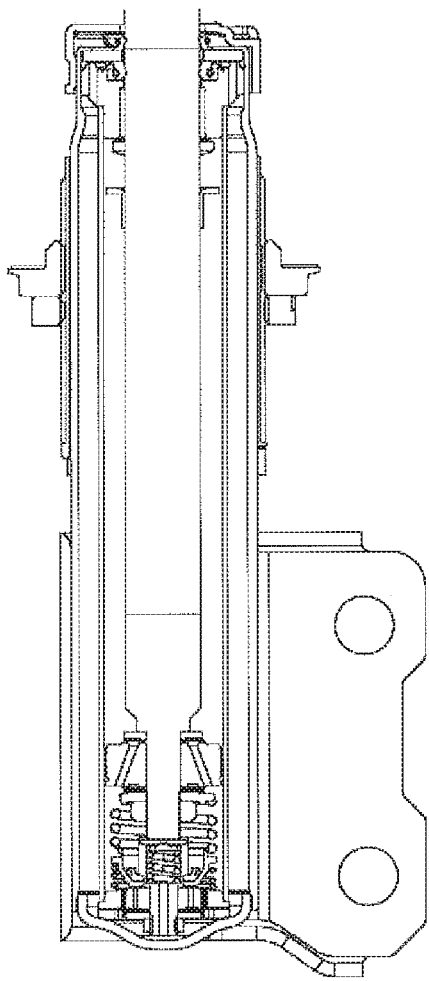
Figure 5B:
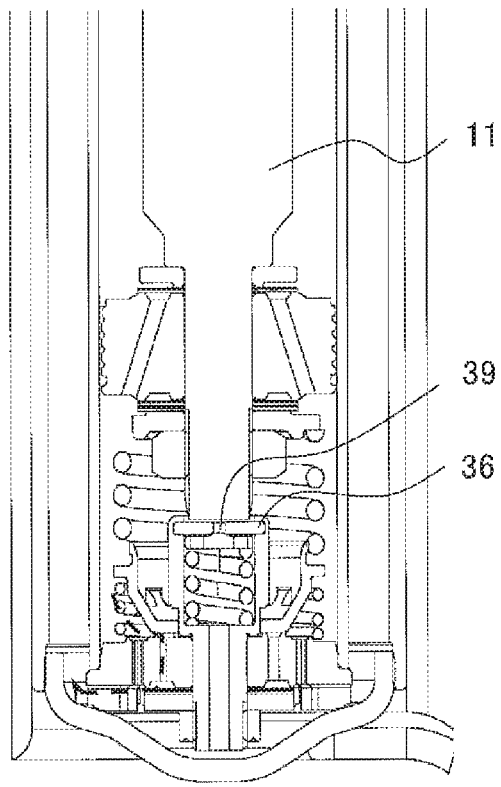
Figure 5C:
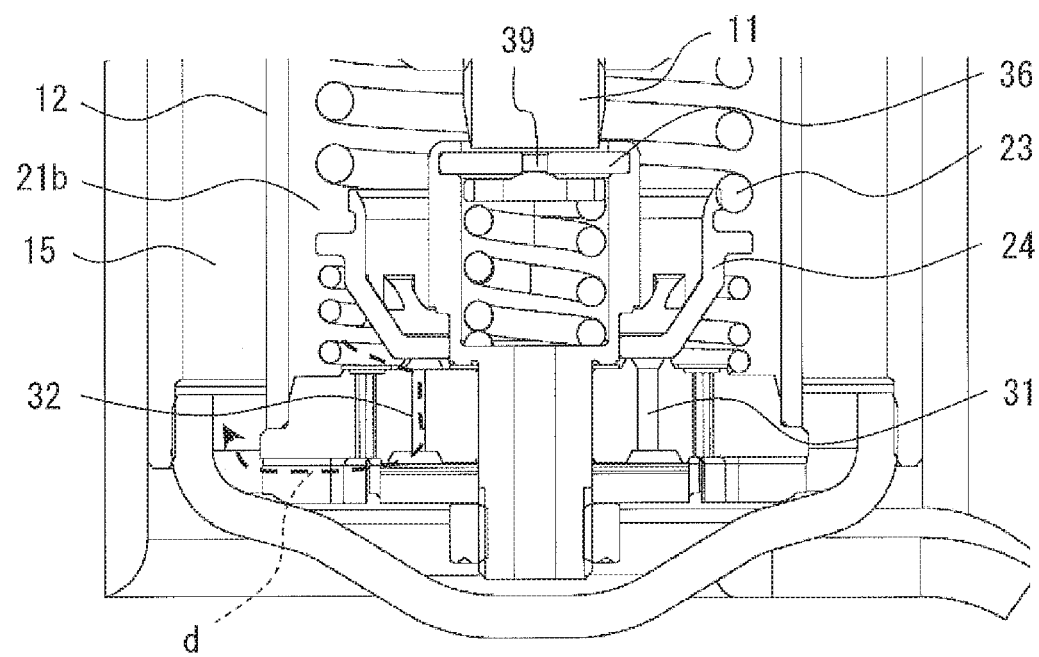
Figure 6B:
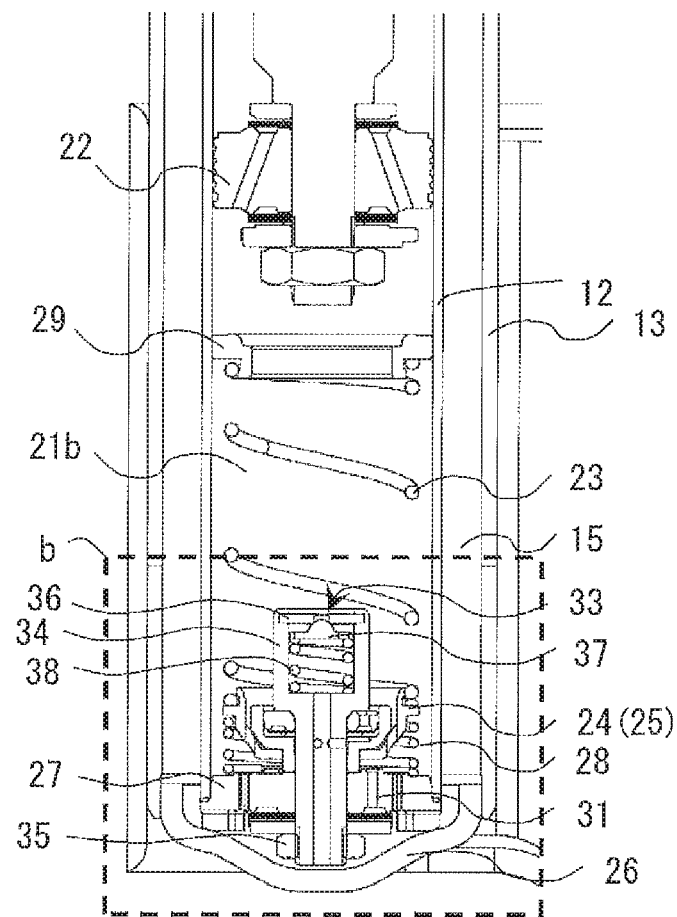
Figure 6C:
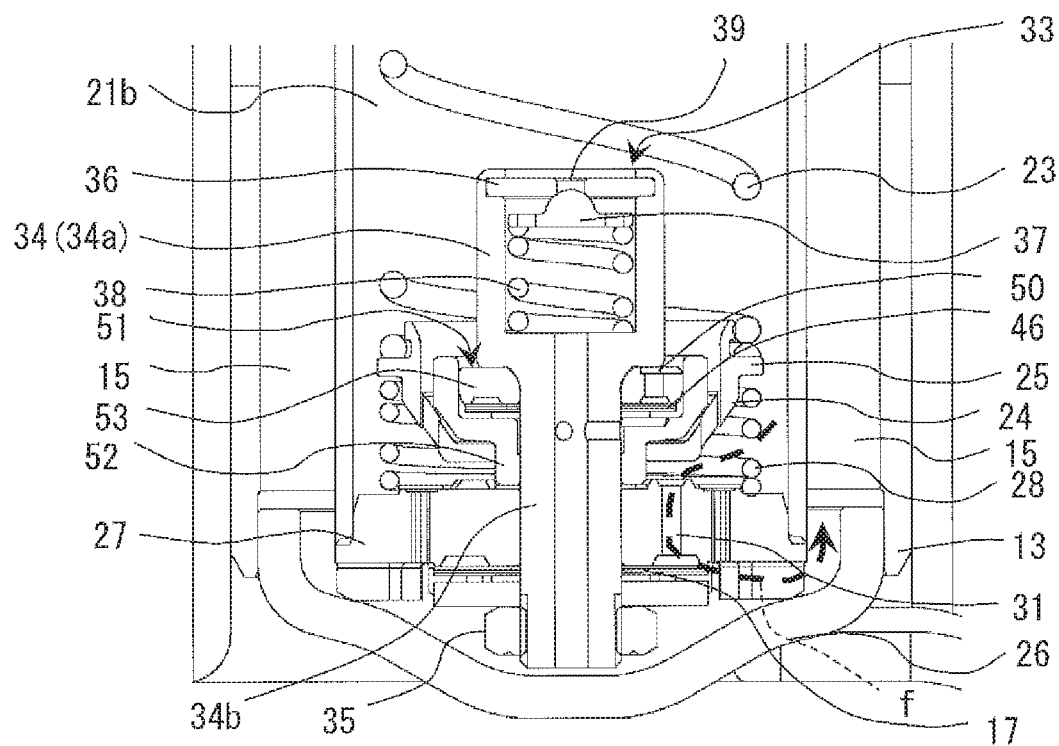
Figure 6D:
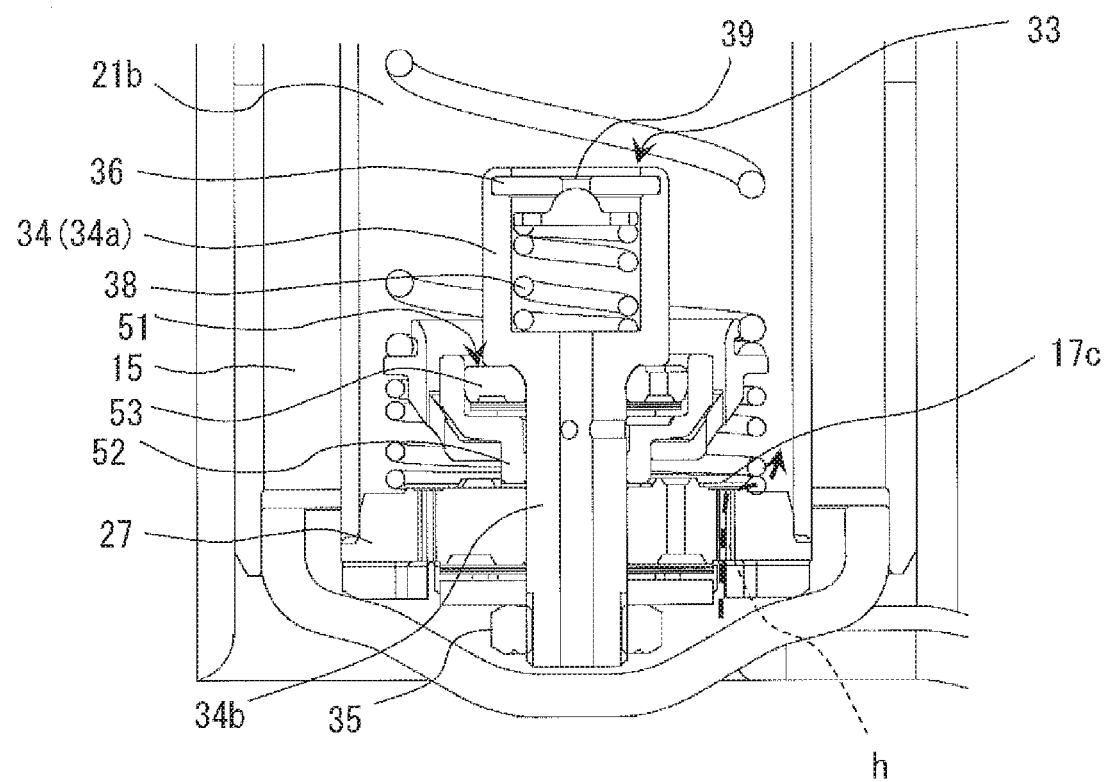
Figure 7A:
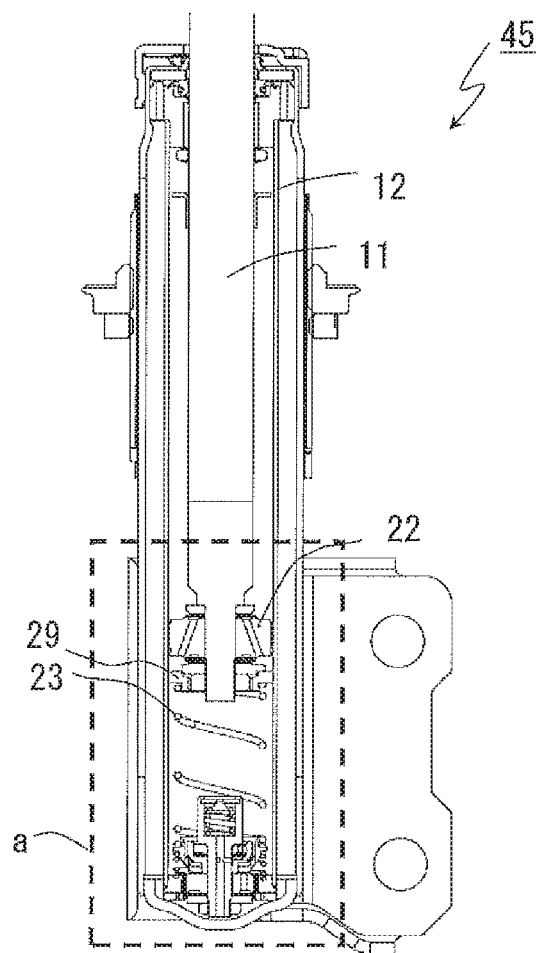
Figure 7B:
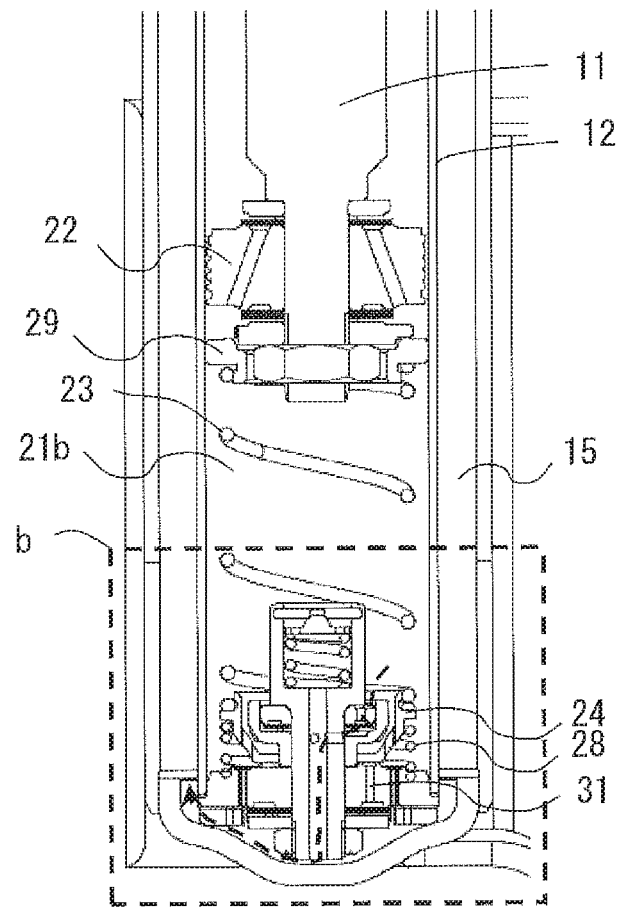
Figure 7C:
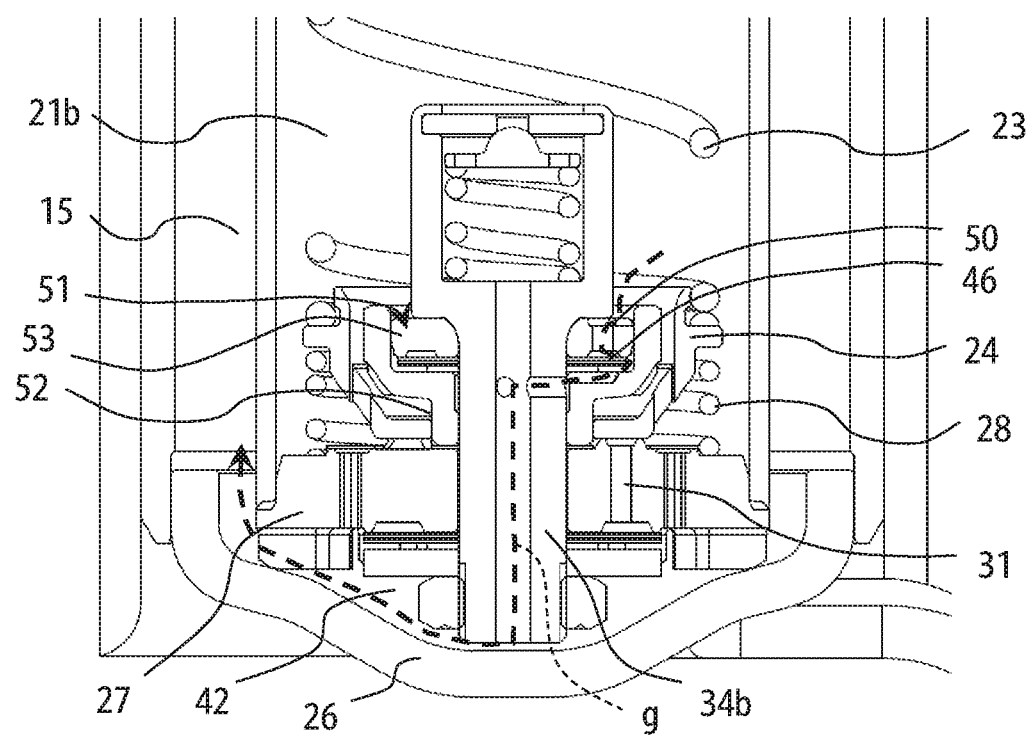
Figure 8A:
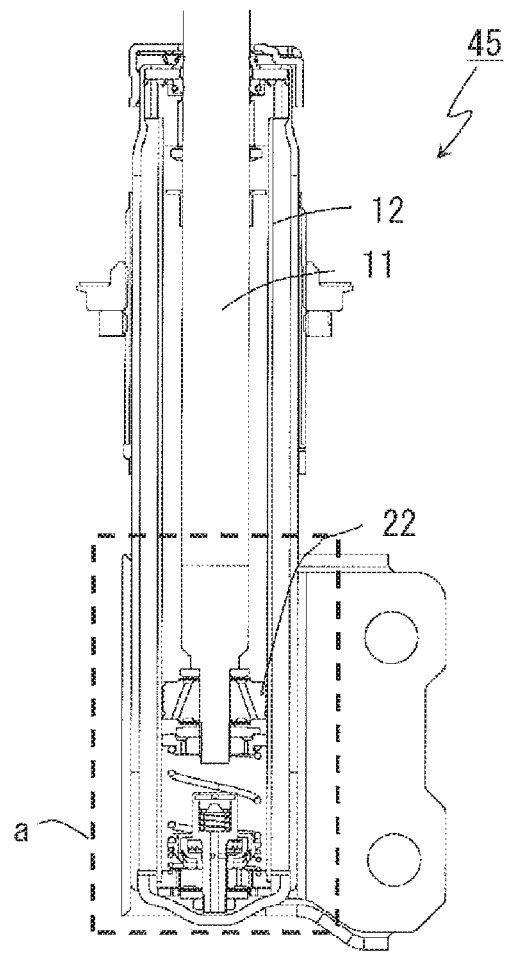
Figure 8B:
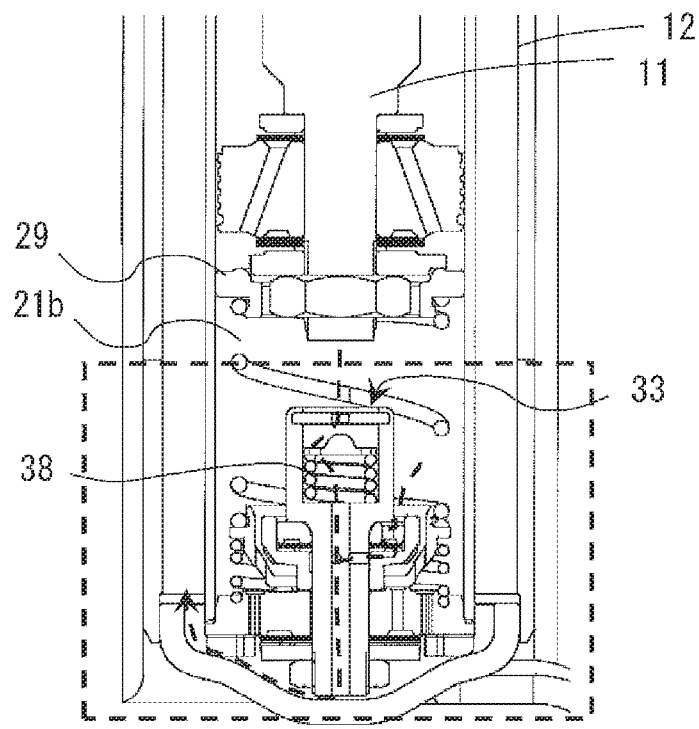
Figure 8C:
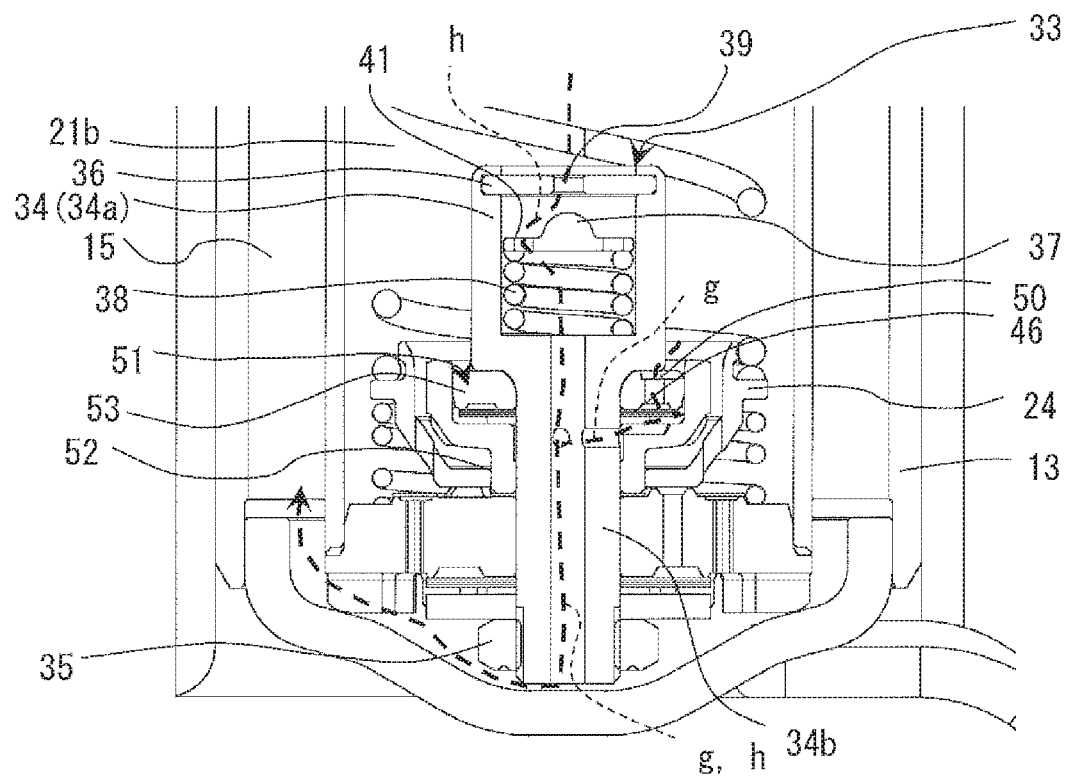
Figure 9A:
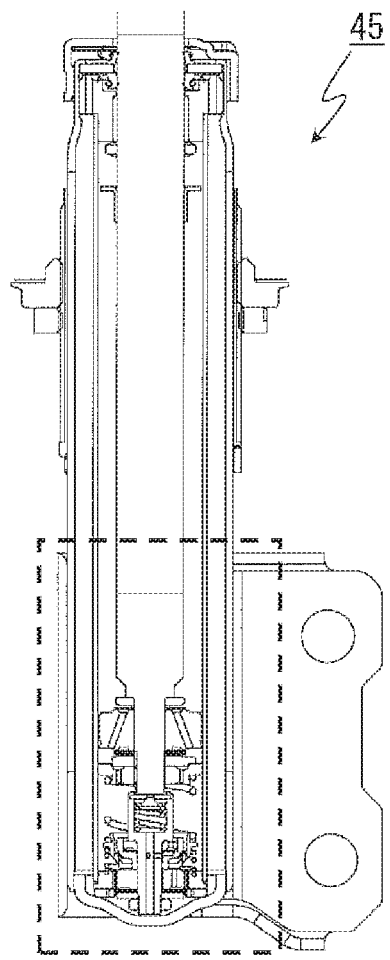
Figure 9B:
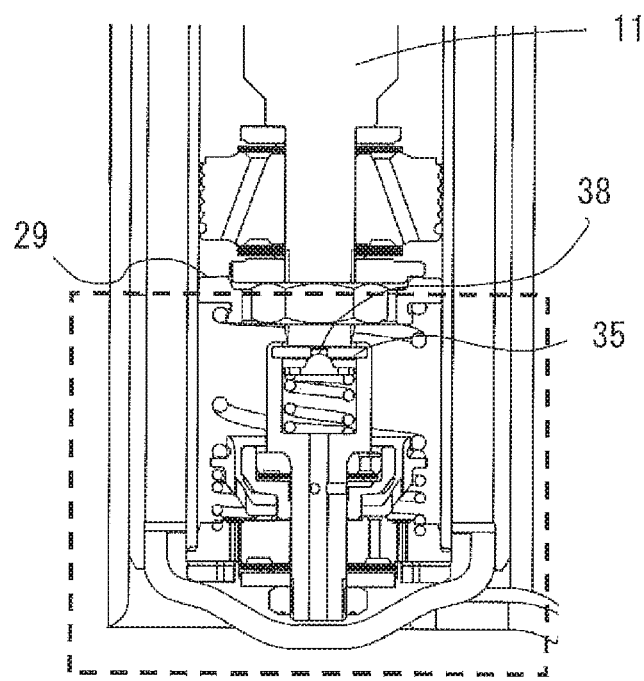
Figure 9C:
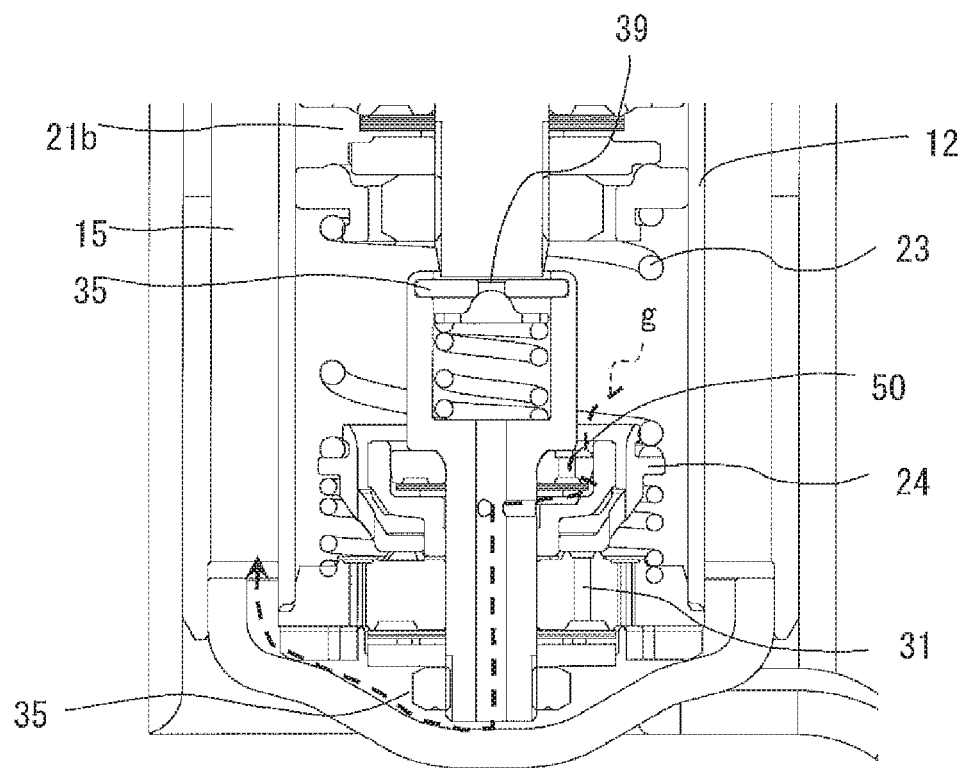
Figure 10B:
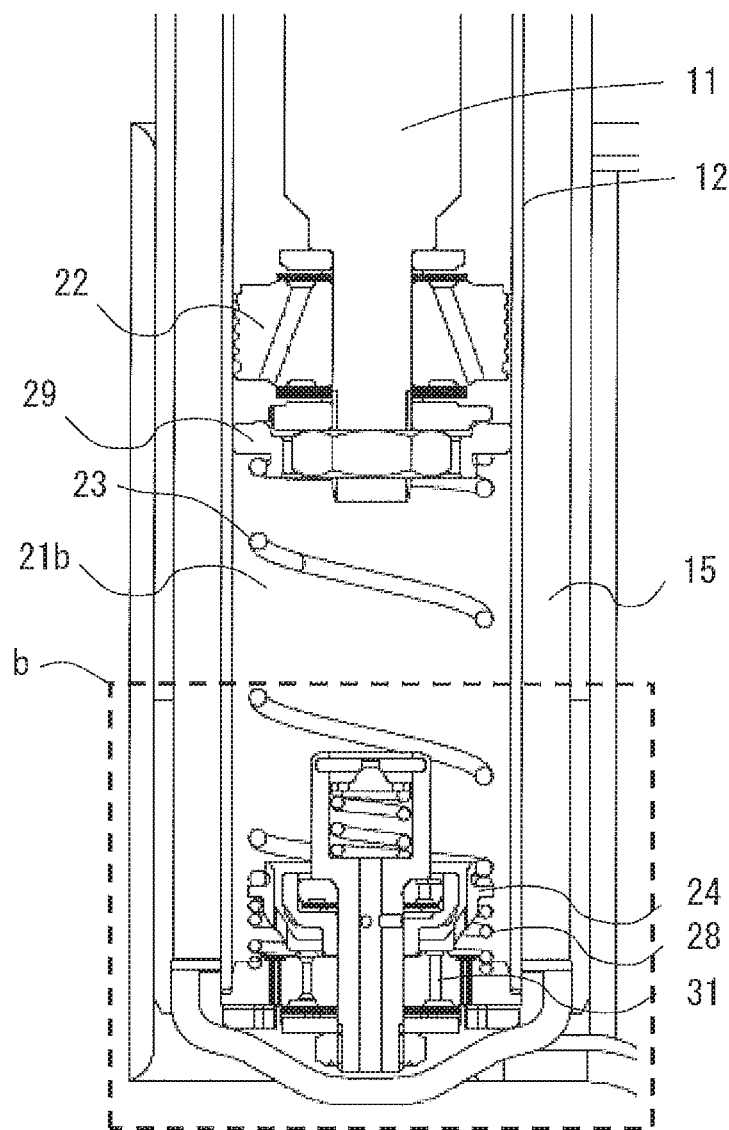
Figure 10C:
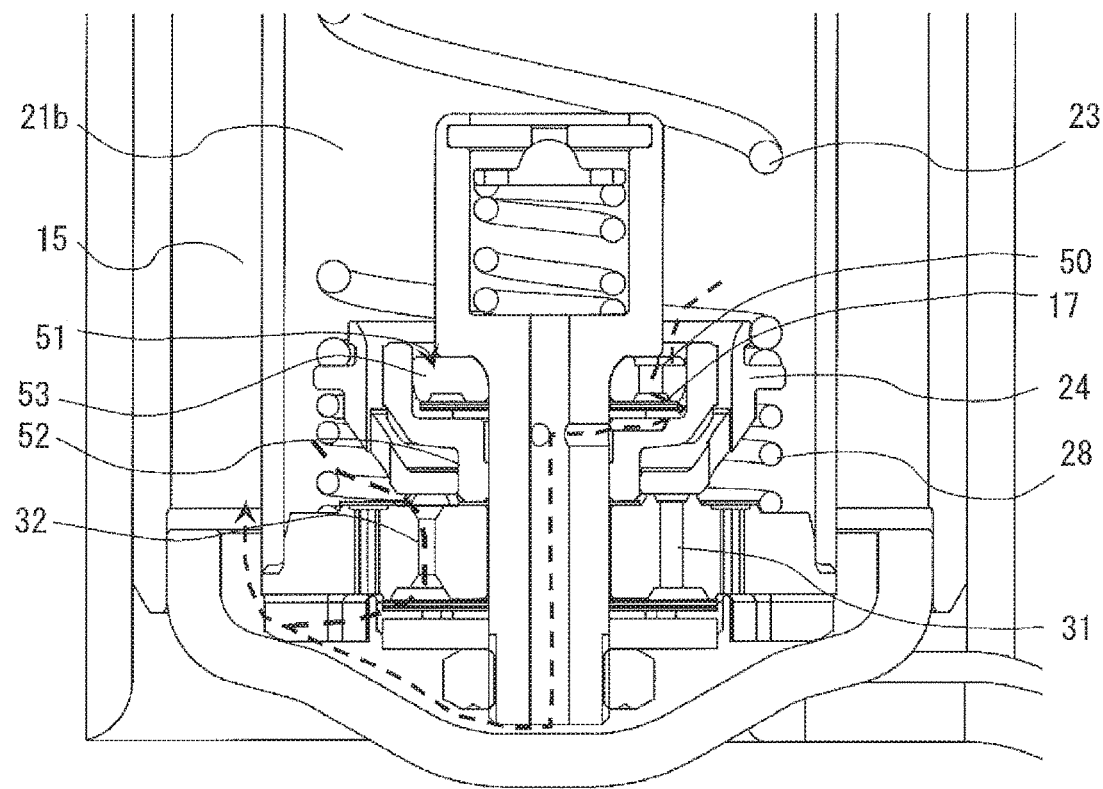

FIG. 5A snows the state of a portion corresponding to that in FIG. 2A in the operation state in a case when the piston rod has moved over the maximum stroke during the compression of the hydraulic damper according to example 1;

FIG. 5B shows the state of a portion corresponding to that in FIG. 2B in the operation state of FIG. 5A;

FIG. 5C shows the state of a portion corresponding to that in FIG. 2C in the operation state of FIG. 5A;

FIG. 6A is a sectional view of a hydraulic damper according to example 2 of the present invention showing a state where the hydraulic damper is not compressed and no load has been caused;

FIG. 6B is an enlarged view showing the portion enclosed by dashed line a in FIG. 6A FIG. 6C is an enlarged view showing the portion enclosed by dashed line b in FIG. 6B;

FIG. 6D shows a flow of oil in the expansion state of FIG. 6A;

FIG. 7A shows the state of a portion corresponding to that in FIG. 6A in the operation state in a case when the hydraulic damper according to example 2 is compressed and a load has started to be applied;

FIG. 7B shows the state of a portion corresponding to that in FIG. 6B in the operation state of FIG. 7A;

FIG. 7C shows the state of a portion corresponding to that in FIG. 6C in the operation state of FIG. 7A;

FIG. 8A shows the state of a portion corresponding to that in FIG. 6A in the operation state in a case when the hydraulic damper according to example 2 has been compressed continuously so as to enter a high load state;

FIG. 8B shows the state of a portion corresponding to that in FIG. 6B in the operation state of FIG. 8A;

FIG. 8C shows the state of a portion corresponding to that in FIG. 6C in the operation state of FIG. 8A;

FIG. 9A shows the state of a portion corresponding to that in FIG. 6A in the operation state in a case when the piston rod has moved over the maximum stroke during the compression of the hydraulic damper according to example 2;

FIG. 9B shows the state of a portion corresponding to that in FIG. 6B in the operation state of FIG. 9A;

FIG. 9C shows the state of a portion corresponding to that in FIG. 6C in the operation state of FIG. 9A;

FIG. 10A shows the operation state in a case when the hydraulic damper according to example 3 is compressed and a load has started to be applied;

FIG. 10B is an enlarged view showing the portion enclosed by dashed line a in FIG. 10A; and FIG. 10C is an enlarged view showing the portion enclosed by dashed line b in FIG. 10B.

EMBODIMENTS

Hereinafter, the embodiments of the present invention will be explained by referring to the drawings.

EXAMPLE 1

Figure 1:
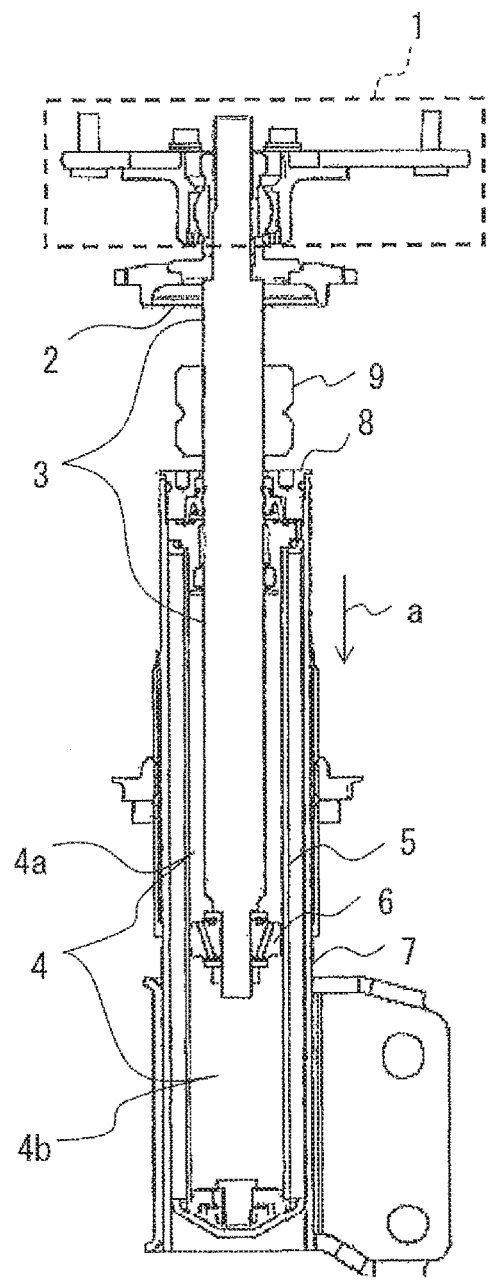
FIG. 1 shows an example of a configuration in which a conventional hydraulic damper uses a bump stop rubber.

FIG. 2A is a sectional view of a hydraulic damper 10 according to example 1. FIG. 2B is an enlarged view showing the portion enclosed by dashed line a in FIG. 2A, and FIG. 2C is an enlarged view showing the portion enclosed by dashed line b in FIG. 1B. Note that the hydraulic damper 10 shown in FIG. 2A through FIG. 2C is in a no-load state, in which compression has not occurred and there is no load.

As shown in FIG. 2A, FIG. 2B and FIG. 2C, the hydraulic damper 10 according to the present example includes a piston rod 11. The piston rod 11 has its upper portion supported by a bearing of a vehicle etc. (not shown), and has the tip-direction portion of its lower portion inserted into a cylinder 12.

The cylinder 12 is accommodated in an outer cylinder 13. A wheel-axis supporting engagement unit 14 that is fixed to a wheel axis supporting unit of a vehicle etc. (not shown) is attached to the outer and lower portion of the outer cylinder 13. A prescribed space is provided between the outer peripheral surface of the cylinder 12 and the inner peripheral surface of the outer cylinder 13, and a reservoir chamber 15 is formed in the space.

The upper end portion of the outer cylinder 13 is formed to be longer than the upper end of the cylinder 12. A bump stopper 16 is fit with the upper end of the outer cylinder 13 from above and is fixed to the outer cylinder 13. At the center of the bump stopper 16, the piston rod 11 is inserted slidably.

The upper-end opening of the outer cylinder 13 is sealed by a flange-shaped oil seal 18 at a position lower than the bump stopper 16, and an annular rod guide 19 is provided between the outer periphery of the lower surface of the flange-shaped oil seal 18 and the circumference portion of the upper-end opening of the cylinder 12. Thereby, the opening of the upper portion of the cylinder 12, is sealed from outside.

The inside of the sealed cylinder 12 forms an oil chamber 21. A piston valve 22 is secured to the tip portion of the piston rod 11. The piston valve 22 slides upwardly and downwardly in the cylinder 12 by being accompanied by the piston rod 11, while partitioning the oil chamber 21 into an upper oil chamber 21a and a lower oil chamber 21b.

Below the piston valve 22, a second spiral spring 23 is disposed. The upper end of the second spiral spring 23 is an free end, and the lower end thereof is engaged with a first valve 24 via the upper surface of a flange 25 that is formed on the upper periphery of a first valve 24. Note that it is possible to employ a configuration in which a second spiral spring guide 29 shown in FIG. 6B is engaged with the upper end of the second spiral spring 23.

Below the first valve 24, a base valve 27 is disposed between the first valve 24 and a bottom stopper 26. The bottom stopper 26 is formed to have a dish-like shape, and the dish-like outer peripheral portion is fit into the inner periphery of the bottom of the outer cylinder 13 so that a sealed space is formed in the outer cylinder 13 and the base valve 27 is held.

A first spiral spring 28 is set between the outer peripheral portion of the upper surface of this base valve 27 and the lower surface of the flange 25 of the first valve 24. The first spiral spring 28 is continuously biasing the first valve 24 in the upper direction, which is the valve opening position.

In the base valve 27, a first compression side port 31 and a second compression side port 32 that bring the lower oil chamber 21b of the cylinder 12 and the reservoir chamber 15 into communications are formed. When an external force is not applied to the second spiral spring 23, the first valve 24 is at the upper-direction opening position of the valve because of the upward biasing force of the first spiral spring 28.

When a slight load has been applied to the lower oil chamber 21b of the cylinder 12 in that state, the oil in the lower oil chamber 21b of the cylinder 12 and the reservoir chamber 15 deforms disk-shaped valves 17 (17a and 17b) downwardly via the first compression side port 31 and the second compression side port 32 so as to outflow, gets in communication with the reservoir chamber 15, and generates a damping force.

A base bolt 34 that passes through the center of the above first valve 24 and the base valve 27 so as to form the outer envelope of a second. valve second valve 33 is provided. The base bolt 34 employs a configuration in which large-diameter tubular unit 34a, which is located at a higher position, and a small-diameter tubular unit 34b, which is located at a lower position, are integrated.

The base bolt 34 is held in such a manner that it can slide upwardly and downwardly on the periphery of the center hole of the first valve 24 because of an inwardly-concave gap portion formed on the outer periphery of the lower portion of the large-diameter tubular unit 34a. The small-diameter tubular unit 34b of the base bolt 34 extends downwardly from the lower portion of the large-diameter tubular unit 34a having the gap portion, and passes through the base valve 27.

The tip of the small-diameter tubular unit 34b passing through the base valve 27 projects to the outside in the lower direction from the base valve 27, is screwed to a base nut 35, and upward/downward movement of the entire base bolt 34 is limited.

A cap washer 36 is swaged at the opening of the upper end of the large-diameter tubular unit 34a of the base bolt 34. A valve washer 37 is disposed in a contact with the lower surface of the cap washer 36. A third spiral spring 38 is set between the lower surface of the valve washer 37 and the internal can portion between the large-diameter tubular unit 34a and the small-diameter tubular unit 34b.

The third spiral spring 38 continuously biases the valve washer 37 upwardly by its extension restorative force. Thereby, when the internal pressure of the lower oil chamber 21b in the cylinder 12 has not become equal to or higher than a prescribed value, a center hole 39 of the cap washer 36 is sealed from inside (below).

Figure 3B:
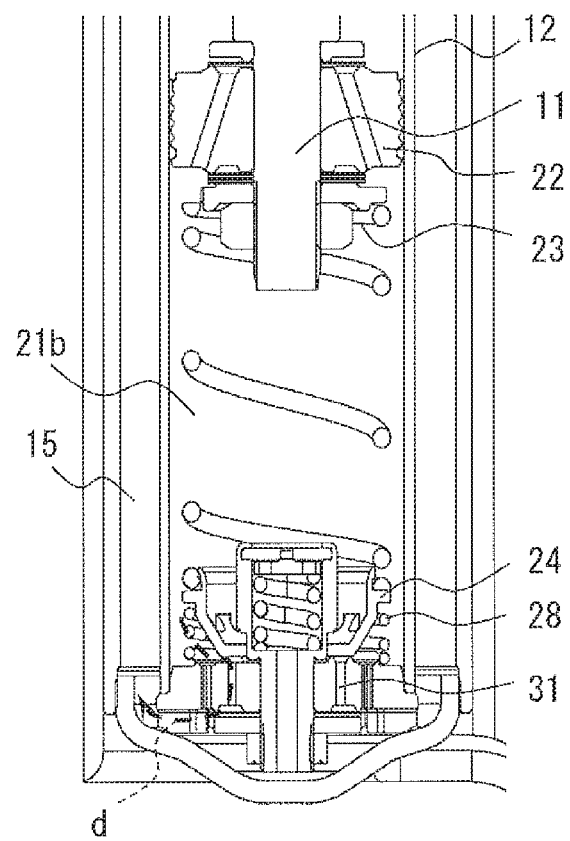
FIG. 3B shows the state of a portion corresponding to that in FIG. 2B in the operation state of FIG. 3A.
Figure 3C:
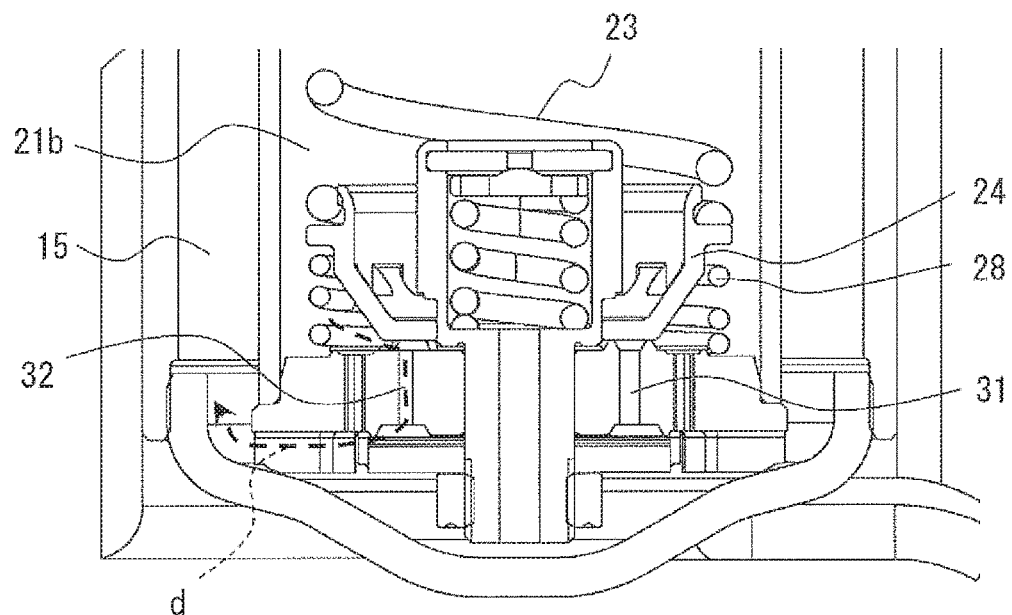
FIG. 3C shows the state of a portion corresponding to that in FIG. 2C in the operation state of FIG. 3A.

FIG. 3A, FIG. 3B and FIG. 3C show the operation states in a case when the hydraulic damper 10 according to example 1 above is compressed and a load has started to be applied, and show the states of the portions corresponding to those shown in FIG. 2A, FIG. 2B and FIG. 2C, respectively.

Figure 4A:
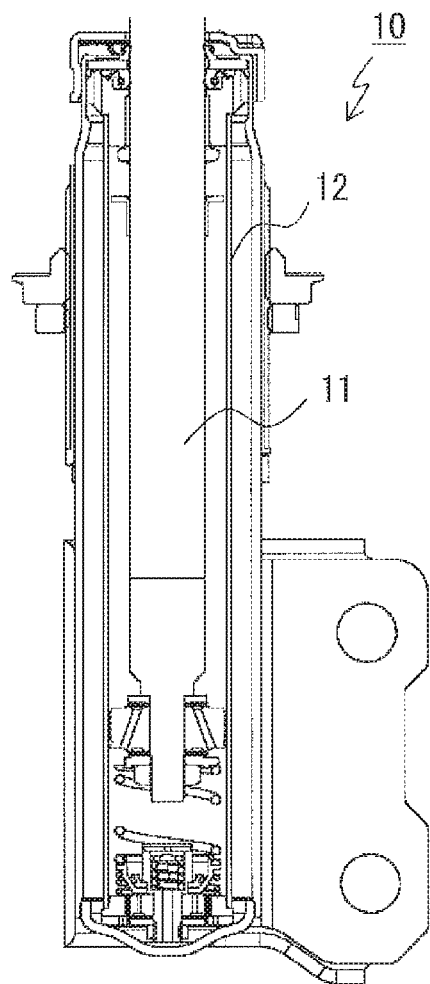
FIG. 4A shows the state of a portion corresponding to that in FIG. 2A in the operation state in a case when the hydraulic damper according to example 1 has been compressed continuously so as to enter a high load state.
Figure 4B:
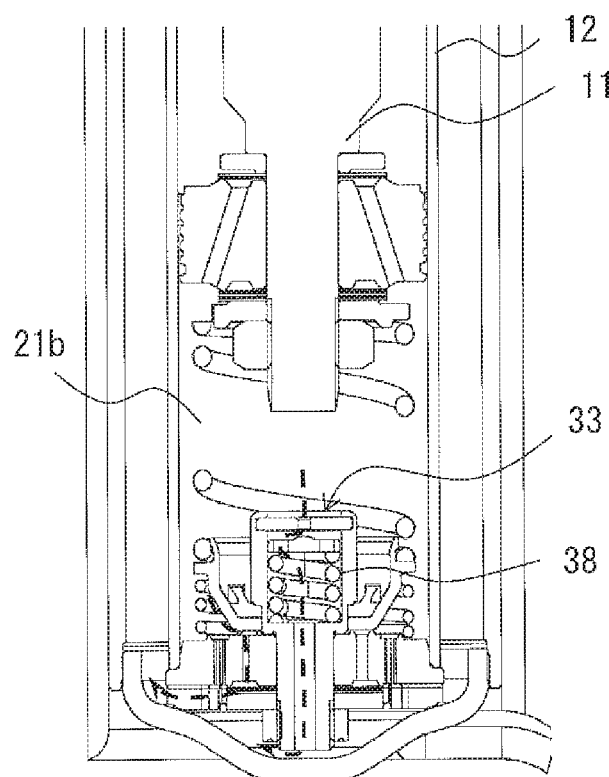
FIG. 4B shows the state of a portion corresponding to that in FIG. 2B in the operation state of FIG. 4A.
Figure 4C:
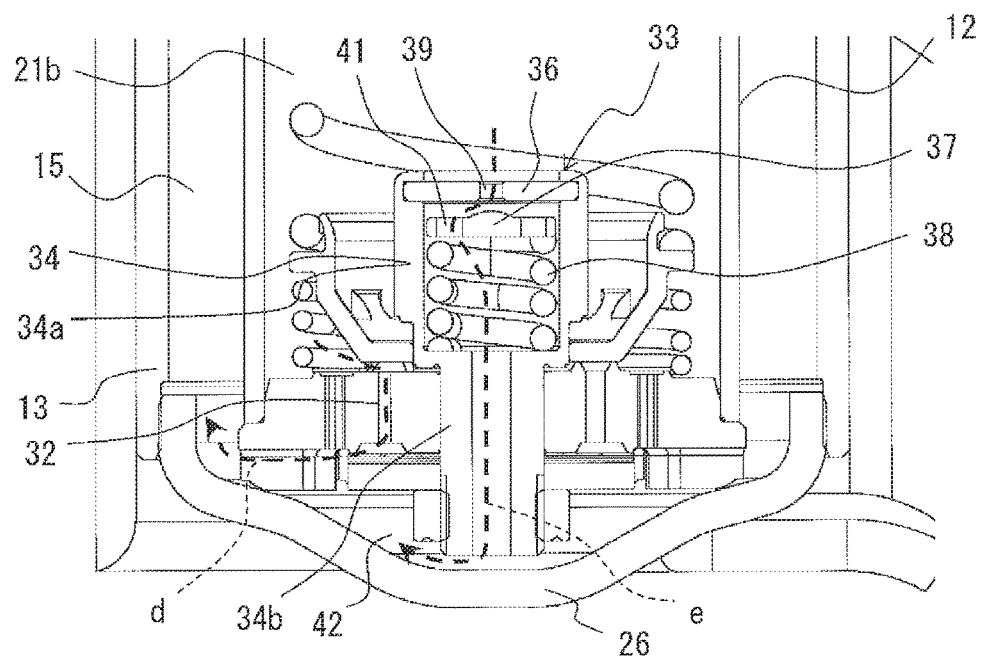
FIG. 4C shows the state of a portion corresponding to that in FIG. 2C in the operation state of FIG. 4A.

FIG. 4A, FIG. 4B and FIG. 4C show the operation states in a case when the compression of the hydraulic damper 10 according to example 1 above has continued and it has entered a high load state, and show the states of the portions corresponding to those shown in FIG. 2A, FIG. 2B and FIG. 2C, respectively.

FIG. 5A, FIG. 5B and FIG. 5C show the operation states in a case when the piston rod has moved over its maximum stroke during the compression of the hydraulic damper 10 according to example 1 above, and show the states of the portions corresponding to those shown in FIG. 2A, FIG. 2B and FIG. 2C, respectively.

In FIG. 3A through FIG. 5C, only portions that are necessary for the explanations of the operations are denoted by the same numerals as those used in FIG. 2A, FIG. 2B and FIG. 2C.

When the piston rod 11 has traveled into the cylinder 12, and the piston valve 22 abuts on the upper free end of the second spiral spring 23 so as to push the second spiral spring 23 downwardly further as shown in FIG. 3A, FIG. 3B and FIG. 3C, a repelling force is generated in the second spiral spring 23 and a load is caused in the hydraulic damper 10.

Also, this repelling force works as a downward biasing force applied to the first valve 24, pushes the first valve 24 downwardly resisting the upward biasing force of the first spiral spring 28. Thereby, the first compression side port 31 is closed and the flow of the oil of the first compression side port 31 is blocked.

Accordingly, the flow channel in the second compression side port 32 denoted by dashed-line arrow d is the only flow channel for the oil flowing from the lower oil chamber 21b to the reservoir chamber 15, the flow rate changes to have a lower flow rate, the flow velocity increases, the differential pressure between the lower oil chamber 21b and the reservoir chamber 15 increases, the resisting force applied to the moving piston rod 11 increases, a load is caused in the hydraulic damper 10, and the damping force thereof increases.

When the piston rod 11 has traveled into the cylinder 12 further so that the hydraulic damper 10 enters a high load state and the internal pressure of the cylinder 12 (internal pressure of the lower oil chamber 21b) has become equal to or lower than a prescribed pressure as shown in FIG. 4A, FIG. 4B and FIG. 4C, that pressure pushes the valve washer 37 of the second valve 33 downwardly resisting the upward biasing force of the third spiral spring 38.

Thereby, the sealing of the center hole 39 of the cap washer 36 is broken, and a new flow channel for the oil in the cylinder 12 is formed as represented by dashed-line arrow e in a space 42 created by the center hole 39 of the cap washer 36, a side hole 41 of the valve washer 37, the large-diameter tubular unit 34a and the small-diameter tubular unit 34b of the base bolt 34, and the bottom stopper 26 with respect to the base valve 27.

By this newly-formed flow channel, the flow velocity of the oil from the cylinder 12 to the reservoir chamber 15 is adjusted to a lower velocity, making it possible to suppress increase in the differential pressure between the lower oil chamber 21b and the reservoir chamber 15. This also makes it possible to prevent internal components from breaking.

In addition to the prevention of the breakage, it is also possible to increase the degree of freedom in the characteristic of the damping force generated in the hydraulic damper 10 by making a mechanical unit of the base bolt 34 change the size of the holes, the repelling forces of the spiral springs, the large/small internal diameters etc. so as to adjust the flow rate. Also, by changing the free length of the second spiral spring, the position at which the first compression port is closed, i.e., the operation point can easily be changed.

When the piston rod 11 has moved into the cylinder 12 over the maximum stroke during the compression of the hydraulic damper 10 as shown in FIG. 5A, FIG. 5B and FIG. 5C, the pressing force generated by the second spiral spring 23 is maintained and the first compression side port 31 remains closed in the first valve 24.

The flow channel of the oil that brings the cylinder 12 (the lower oil chamber 21b) and the reservoir chamber 15 into communication is maintained by the second compression side port 32, which is denoted by dashed-line arrow d, alone. When the pressure in the cylinder 12 has not become equal to or higher than a prescribed pressure, this maximum stroke state is not different from the "load starting state" shown in FIG. 3A through FIG. 3C.

The high load state shown in FIG. 4A through FIG. 4C does not always exist between the no load sate shown in FIG. 2A through FIG. 2C and the maximum stroke state shown in FIG. 5A through FIG. 5C, although it depends also upon the level of the impact applied to the hydraulic damper 10 (the velocity of the piston rod 11 moving into the cylinder 12). In some cases, the maximum stroke state occurs from the no load state without going through a high load state. In other words, it is a case where a generated damping force is small.

As described above, according; to the hydraulic damper 10 of example 1, an appropriate damping force in accordance with a load can be obtained at an arbitrary position of the piston rod 11 in a compressed state. Also, by using three types of spiral springs (23, 28 and 38) in the cylinder 12, it is possible to provide a position-and-velocity dependent hydraulic damper that employs a simple structure with a reduced number of components and suppressed increase in the dimensions.

The second compression side port 32 is disposed in the base valve 27 in example 1 above, whereas the scope of the invention is not limited to this and any configurations in which a second compression side port exists in communication channel between the lower oil chamber 21b on the cylinder compression. side and the reservoir chamber 15 can be employed.

When the hydraulic damper 10 expands, the oil opens a one-way disk-shaped. valve 17c from return port h of the base valve 27 and moves to the lower oil chamber 21b.

EXAMPLE 2

FIG. 6A is a sectional view of a hydraulic damper 45 according to example 2. FIG. 6B is an enlarged view showing the portion enclosed by dashed line a in FIG. 6A, and FIG. 6C is an enlarged view showing the portion enclosed by dashed line b in FIG. 6B.

Note that the hydraulic damper 45 shown in FIG. 6A through FIG. 6C is in a no-load state, in which compression has not occurred and there is no load.

FIG. 7A, FIG. 7B and FIG. 7C show the operation states in a case when the hydraulic damper 45 according to example 2 shown in FIG. 6A through FIG. 6C is compressed and a load has started to be applied, and show the states of the portions corresponding to those shown in FIG. 6A, FIG. 6B and FIG. 6C, respectively.

FIG. 8A, FIG. 8B and FIG. 8C show the operation states in a case when the compression of the hydraulic damper 45 according to example 2 above has continued and it has entered a high load state, and show the states of the portions corresponding to those shown in FIG. 6A, FIG. 6B and FIG. 6C, respectively.

FIG. 9A, FIG. 9B and FIG. 9C show the operation states in a case when the piston rod has moved over its maximum stroke during the compression of the hydraulic damper 45 according to example 2 above, and show the states of the portions corresponding co those shown in FIG. 6A, FIG. 6B and FIG. 6C, respectively.

In the hydraulic damper 45 according to example 2 shown in FIG. 6A through FIG. 9C, the same constituent as those in the hydraulic damper 10 according to example 1 shown in FIG. 2A through. FIG. 5C are denoted by the same numerals as those used in FIG. 2A through FIG. 5C.

In FIG. 9A through FIG. 9C, only portions that are necessary for the explanations of the operations are denoted by the same numerals as those used in FIG. 6A, FIG. 6B and FIG. 6C.

In the hydraulic damper 10 according to example 1 above, the upper end portion of the second spiral spring 23 not engaged with other members in a no-load state is an unstable free end, and when this spring has a long free length and a large outer diameter and there is not a space with respect to the inner wall of the cylinder, it wobbles from front to back and from side to side, resulting in a possibility that it comes into sliding contact with the inner wall of the cylinder to damage the inner wall of the cylinder or to make faint noises, In this hydraulic damper 45 according to example 2, as shown in FIG. 6A through FIG. 9C, a second spiral spring guide 29 engaged with the upper end portion of the second spiral spring 23 is provided. The second spiral spring guide 29 is annular and less damaging when it contacts the inner wall of the cylinder, and the second spiral spring guide 29 itself is configured by using resin etc. that is resistant to attrition so that the peripheral portion of external portion can slide upwardly and downwardly in the cylinder.

An annular portion having a small diameter is provided. to the lower portion of the second spiral spring guide 29 in such a manner that the annular portion projects downwardly and the upper end portion of the second spiral spring 23 is engaged with the outer periphery of the annular portion of a small diameter.

Thereby, as shown in FIG. 6A through FIG. 6C, the upper end portion of the second spiral spring 23 is held by the second spiral spring guide 29 so that it is continuously stable without wobbling from front to back and from side to side even when the hydraulic damper 45 is in a no-load state.

Also, from the hydraulic damper 45 according to example 2, the second compression side port 32 shown in FIG. 2A through FIG. 5C has been removed. Instead, a third valve 51 is provided to the inner bottom portion of the first valve 24 as shown in FIG. 6A through FIG. 9C in example 2.

The third valve 51 has a funnel-shaped sub-valve cup 52, and the upper portion of the funnel shape encloses the gap portion between the lower end portion of the large-diameter tubular unit 34a of the base bolt 34 and the small-diameter tubular unit 34b of the base bolt 34, and the lower end of the funnel shape extends downwardly to the center portion of the small-diameter tubular unit 34b of the base bolt 34 by passing through the bottom portion of the first valve 24.

Thereby, the third valve 51 is sandwiched between the base valve 27 and the base bolt 34 and is fixed with screwed base nut 35. The first valve 24 is held by the first spiral spring 28 on the upper side in such a manner that it can slide upwardly and downwardly with respect to the outer diameter portion of the sub-valve cup 52.

In the upper portion of the funnel shape of the sub-valve cup 52 of the third valve 51, a small-diameter disk-shaped valve 46 is disposed, the disk-shaped valve 46 having a diameter slightly smaller than that of the disk-shaped valve 17. The small-diameter disk-shaped valve 46 has a center hole, and this center hole is fit into the outer periphery surface of the small-diameter tubular unit 34b of the base bolt 34.

This small-diameter disk-shaped valve 46 has its upper surface around the center hole held by a sub valve plate 53 and also brings the upper surface into pressure contact with the opening of the lower portion of a third compression port. Note that the configurations and the functions of the portions other than the above are similar to those in the cases of FIG. 2A through FIG. 5C.

When a slight load has been applied to the lower oil chamber 21b of the cylinder 12 in the above configuration, the pressure increases in the lower oil chamber 21b so that the oil in the lower oil chamber 21b of the cylinder 12 deforms the disk-shaped valves 17 downwardly via the first compression side port 31 so as to outflow, gets in communication with the reservoir chamber 15, and generates a damping force as represented by dashed-line arrow f in FIG. 6C.

When the piston rod 11 has further traveled into the cylinder 12, the lower end portion of the piston valve 22 is fit into the center hole of the second spiral spring guide 29, and is engaged with the upper end portion of the second spiral spring 23 via the second spiral spring guide 29.

Then, the piston rod 11 starts pushing the second. spiral spring 23 downwardly via the second spiral spring guide 29. When the piston rod 11 further pushes the second spiral spring 23 downwardly, a repelling force is generated in the second spiral spring 23 and a load is caused in the hydraulic damper 45.

Also, the above repelling force works as a downward biasing force applied to the first valve 24 and pushes the first valve 24 downwardly resisting the upward biasing force of the first spiral spring 28. Thereby, the first compression side port 31 is closed and the flow of the oil of the first compression side port 31 shown in FIG. 6C is blocked.

The flow of the oil from the lower oil chamber 21b to the reservoir chamber 15 is blocked, the differential pressure between the lower oil chamber 21b and the reservoir chamber 15 increases, the resisting force applied co the moving piston rod 11 increases, a certain load is caused in the hydraulic damper 45, and the damping force thereof increase.

When the piston rod 11 has traveled into the cylinder 12 further so that the hydraulic damper 10 enters a load state and the internal pressure of the cylinder 12 (internal pressure of the lower oil chamber 21b) has increased as shown in FIG. 7A, FIG. 7B and FIG. 7C, the internal pressure of the first valve 24 that is in communication with the lower oil chamber 21b also increases so that the oil in the first valve 24 deforms the small-diameter disk-shaped valve 46 downwardly via a third compression port 50 so as to outflow.

Thereby, first new flow channel g, represented by the dashed-line arrow in FIG. 7C, for the oil in the cylinder 12 is formed in the space 42 created by the first valve 24, the third compression port 50, the small-diameter disk-shaped. valve 46, a communication hole to the small-diameter tubular unit 34b of the base bolt 34, the tube of the small-diameter tubular unit 34b and the bottom stopper 26 with respect to the base valve 27.

By this newly-formed flow channel g, the flow velocity of the oil from the cylinder 12 to the reservoir chamber 15 is adjusted to a lower velocity, making it possible to suppress increase in the differential pressure between the lower oil chamber 21b and the reservoir chamber 15, and the resisting force applied to the piston rod 11 decreases so as to reduce the damping force of the hydraulic damper 45.

When the piston rod 11 has traveled into the cylinder 12 further so that the hydraulic damper 45 enters a high load state and the internal pressure of the cylinder 12 (internal pressure of the lower oil chamber 21b) has become equal to or lower than a prescribed pressure as shown in FIG. 8A, FIG. 8B and FIG. 8C, that pressure pushes the valve washer 37 of the second valve 33 downwardly resisting the upward biasing force of the third spiral spring 38.

Thereby, the sealing of the center hole 39 of the cap washer 36 is broken, and new flow channel h for the oil in the cylinder 12 is formed, as represented by the dashed-line arrow, in such a manner that it passes through the center hole 39 of the cap washer 36, the side hole 41 of the valve washer 37 and the large-diameter tubular unit 34a of the base bolt 34 and it merges with first new flow channel g, which was described above.

In that case too, this newly formed flow channel h, together with first new flow channel g, adjusts the velocity of the oil from the cylinder 12 to the reservoir chamber 15 to a lower velocity, making it possible to suppress increase in the differential pressure between the lower oil chamber 21b and the reservoir chamber 15. This also makes it possible to prevent internal components from breaking.

In addition to the prevention of the breakage, it is also possible co increase the degree of freedom in the characteristic of the damping force generated in the hydraulic damper 45 by making a mechanical unit of the base bolt 34 change the size of the holes, the repelling forces of the spiral springs, the large/small internal diameters etc. so as to adjust the flow channel.

Also, by changing the number, the thicknesses, the outer diameters, etc. of small-diameter disk-shaped valves that are stacked between the sub-valve cup and the sub valve plate, the attenuation characteristic can easily be changed. Further, by changing the free length of the second spiral spring, the position at which the first compression port is closed, i.e., the operation point can easily be changed.

When the piston rod 11 has moved into the cylinder 12 over the maximum stroke during the compression of the hydraulic damper 45 as shown in FIG. 9A, FIG. 9B and FIG. 9C, the pressing force generated by the second spiral spring 23 is maintained and the first compression side port 31 remains closed in the first valve 24.

The flow channel of the oil by which the cylinder 12 (the lower oil chamber 21b) and the reservoir chamber 15 communicate are maintained by new flow channel g, which is represented by the dashed-line arrow, alone. When the pressure in the cylinder 12 has not become equal to or higher than a prescribed pressure, this maximum stroke state is not different from the "load starting state" shown in FIG. 7A through FIG. 7C.

The high load state shown in FIG. 8A through FIG. 8C does not always exist between the no load sate shown in FIG. 6A through FIG. 6C and the maximum stroke state shown in FIG. 9A through FIG. 9C, although it depends also upon the level of the impact applied to the hydraulic damper 45 (the velocity of the piston rod 11 moving into the cylinder 12).

In some cases, the maximum stroke state emerges from the no load state without going through a high load state. In other words, it is a case where there is a feeling that a damping force is small. Note that when the hydraulic damper 10 expands, the oil opens a one-way disk-shaped valve 17c from return port h of the base valve 27 and moves to the lower oil chamber 21b.

As described above, according to the hydraulic damper 45 of example 2, an appropriate damping force in accordance with a load can be obtained at an arbitrary position of the piston rod 11 in a compressed state. Also, by using three types of spiral springs (23, 28 and 38) in the cylinder 12, it is possible to provide a position-and-velocity dependent hydraulic damper that employs a simple structure with a reduced number of components and suppressed increase in the dimensions.

EXAMPLE 3

FIG. 10A is a sectional view of a hydraulic damper 60 according to example 3 that is a result of combining the configurations of examples 1 and 2. FIG. 10B is an enlarged view showing the portion enclosed by dashed line a in FIG. 10A, and FIG. 10C is an enlarged view showing the portion enclosed by dashed line b in FIG. 10B.

In example 3, the second compression side port 32 of example 1 and the third valve 51 of example 2 are included, and the effect caused by the first valve 24 closing the first compression side port corresponds to a combination of examples 1 and 2.

Industrial Applicability

The present invention can be applied to a hydraulic damper.

EXPLANATION OF NUMERALS

1 upper mount
2 upper spring sheet
3 piston rod 4 oil chamber
4a upper oil chamber
4b lower oil chamber
5 cylinder
6 piston valve
7 outer cylinder
8 bump stopper
9 bump stop rubber
10 hydraulic damper
11 piston rod
12 cylinder
13 outer cylinder
14 wheel-axis supporting engagement unit
15 reservoir chamber
16 bump stopper
17(17a,17b,17c) disk-shaped valve
18 flange-shaped oil seal
19 annular rod guide.
21(21a,21b) oil chamber
22 piston valve
23 second spiral spring
24 first valve
25 flange
26 bottom stopper
27 base valve
28 first spiral spring
29 second spiral spring guide
31 first compression side port
32 second compression side port
33 second valve
34 base bolt
34a large-diameter tubular unit
34b small-diameter tubular unit 34b
35 base nut
36 cap washer
37 valve washer
38 third spiral spring
39 center hole
41 side hole
42 space
45 hydraulic damper
46 small-diameter disk-shaped valve
50 third compression port
51 third valve
52 sub-valve cup
53 a sub valve plate
60 hydraulic damper

The invention claimed is:
1. A hydraulic damper comprising:
an inner cylinder, wherein oil encapsulates the inner cylinder to form an oil chamber in the inner cylinder;
a piston rod that reciprocates in the oil chamber;
a piston valve that is secured to a tip of the piston rod, the piston valve partitions the oil chamber into an upper oil chamber and a lower oil chamber and reciprocates in sliding contact with inner periphery of the inner cylinder by the reciprocation of the piston rod;
an outer cylinder covering an outer periphery of the inner cylinder;
a reservoir chamber defining a space between an inner peripheral surface of the outer cylinder and an outer peripheral surface of the inner cylinder and encapsulating oil and gas;
a bottom stopper seals sealing a bottom portion of the outer cylinder from outside;
a base valve that is held by the bottom stopper and that has a first compression side port that flows the oil from the lower oil chamber to the reservoir chamber;
a first valve held by the base valve via a first spiral spring;
a second spiral spring held by the first valve, the second spiral spring set between the first valve and the piston valve to generate downward repelling force when receiving a pressing force from the piston valve and close the first compression side port by pressing the first valve downwardly resisting a biasing force of the first spiral spring;
a second valve disposed to pass through centers of the first valve and the base valve to adjust a flow rate of the oil with respect to the reservoir chamber when a pressure of the lower oil chamber of the inner cylinder becomes equal to or higher than a prescribed level because of an external load; and
a third valve provided at an inner bottom portion of the first valve, the third valve positioned between a hole of the first valve through which the second valve passes and outer periphery of the second valve to adjust a flow rate of the oil with respect to the reservoir chamber in accordance with a prescribed pressure of the lower oil chamber of the inner cylinder prior to the adjustment of the flow rate of the oil by the second valve, wherein the third valve includes a third compression side port that flows the oil from the lower oil chamber to the reservoir chamber and a valve opens and closes the third compression side port.

2. The hydraulic damper according to claim 1, wherein the base valve includes a second compression side port that flows the oil from the lower oil chamber to the reservoir chamber;
wherein the second spiral spring closes the first compression side port from among the first compression side port and the second compression side port by pushing the first valve downwardly while the second compression side port maintains flow of the oil from the lower oil chamber to the reservoir chamber.

* * * * *